UNITED STATES PATENT OFFICE.

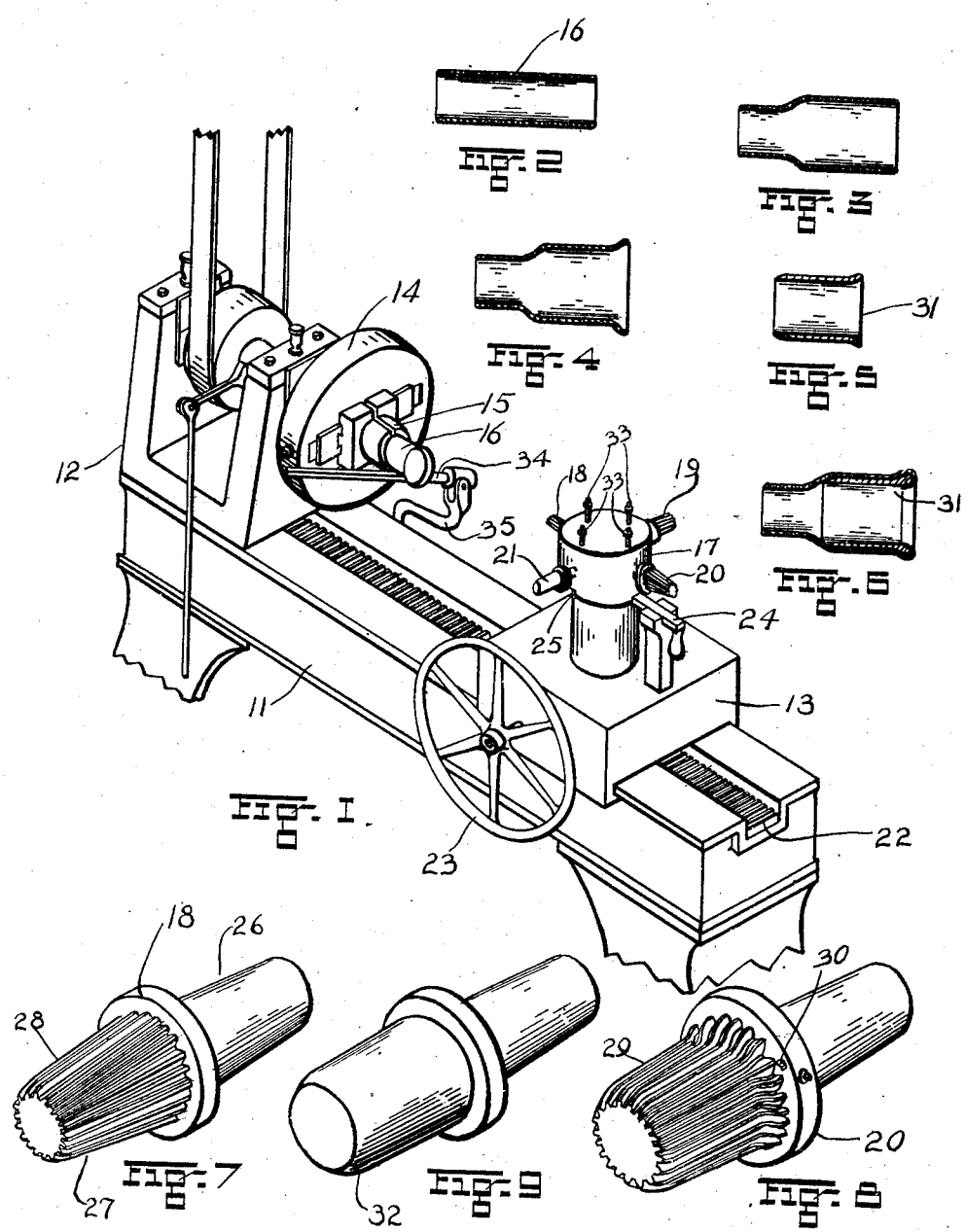

ROBERT A. MERRILL, OF CINCINNATI, OHIO.

TOOL FOR MAKING FERRULES.

972,122. Specification of Letters Patent. Patented Oct. 4, 1910.

Application filed January 26, 1910. Serial No. 540,108.

*To all whom it may concern:*

Be it known that I, ROBERT A. MERRILL, a citizen of the United States of America, and resident of Cincinnati, Hamilton county, State of Ohio, have invented certain new and useful Improvements in Tools for Making Ferrules, of which the following is a specification.

This invention relates to plumbers' ferrules and has for an object to produce means for expanding one end of a pipe section and for inserting a cylindrical band or collar into the end of the pipe, after it has been expanded. This and other objects I attain by means of the apparatus illustrated in the drawings accompanying this application and forming a part thereof.

Figure 1 is a perspective view of a machine for manufacturing plumbers' ferrules. Fig. 2 is a sectional view of a short piece or section of pipe used in the operation of forming a ferrule. Figs. 3 and 4 are sectional views of the pipe shown in Fig. 2, and illustrate the condition of the pipe at successive steps in the operation of forming a ferrule. Fig. 5 is a sectional view of an iron ferrule, or band, which is inserted into the expanded end of the pipe. Fig. 6 is a sectional view of the finished ferrule with the iron collar in place. Fig. 7 is a perspective view of a tool used in the first operation of forming the ferrule. Fig. 8 is a perspective view of a tool used in the third operation. Fig. 9 is a perspective view of a tool, which is employed to insert the iron ferrule or band, illustrated in Fig. 5, into the expanded end of the pipe.

The apparatus illustrated in Fig. 1 is similar in many respects to an ordinary lathe and consists of a body portion 11, on which a head stock 12 and a tail stock 13 are mounted. A belt driven chuck 14 is journaled on the head stock 13 and is provided with adjustable jaws 15, which are adapted to hold in place a piece of the soft metal pipe, such as a lead pipe 16, during the operation of forming a ferrule. The tail stock 13 is provided with a rotatively mounted turret 17, on which radially extending tools 18, 19, 20 and 21 are mounted. The tail stock is movable along the body 11, for the purpose of presenting one or the other of the tools, carried by the turret, to the piece to be worked upon. A longitudinally extending rack 22 is provided on the body 11, and the tail stock is reciprocated on the body by means of a hand wheel 23 and a pinion operated by the hand wheel, and engaging the teeth of the rack 22. A bolt or latch 24 is mounted on the tail stock 13 and is adapted to engage one or another of a number of notches 25, provided on the turret, for holding the turret in place, while one or the other of the tools, carried by it, are in the operative position.

The tool 18 is employed in the first operation of forming the ferrule and consists of a mounting shank 26 and a tapered portion 27, which is provided with longitudinally extending grooves, forming a series of teeth 28. The outer edges of the teeth 28 are rounded and the ends of the teeth are tapered down on a slight curve, so that all sharp edges are removed.

The tool 19 which is employed in the second operation of expanding the pipe 16 is similar to the tool 18, the only points of difference being that the operating end is larger and is not provided with as great a taper.

The tool 20 is used in the final operation of expanding the end of the pipe 16, and, like the tool 18, consists of a mounting shank and an operating end, which is grooved to form a series of longitudinally extending teeth 29. The taper of this tool is not as great as the taper of the tool 19, but the inner ends of the teeth 29 flare outwardly, so as to expand the outer edge of the pipe 16 beyond the remainder of the pipe.

A knife or cutter 30 is mounted on the tool 20, adjacent to the inner ends of the teeth 29, and is adapted to trim the edge of the pipe 16, after it has been expanded by the tool.

The tool 21 is employed to introduce an iron ferrule or band 31 into the expanded end of the pipe 16. This tool consists of a mounting shank and an operating end 32, adapted to receive the band 31 and to introduce it into the expanded pipe. The portion 32 is cylindrical and is not tapered except at its end, where it is curved for the purpose of allowing it to be easily introduced into the pipe 16.

The turret 17 is provided with tapered holes, into which the shanks of the tools 18, 19, 20 and 21 are adapted to be driven. The tools are also held in place by means of set screws, 33.

During the operation of forming a ferrule, a short section of pipe 16, as illustrated in Fig. 2, is clamped in place on the chuck 14, by means of the jaws 15. The turret 17 is then turned to such a position, that the tool 18 will engage the end of the pipe, when the tail stock is moved up to the chuck. The turret is then locked to prevent rotation by means of the bolt 24, and the tail stock is moved by means of the hand wheel 23, so that the tool 18 is forced into the end of the rotating pipe 16. This operation expands the pipe, as shown in Fig. 3. The tail stock is then shifted, to withdraw the tool 18, and the turret 17 turned, so that the tool 19 may be introduced into the pipe. The tool 19 operates to further expand the pipe, and finally the tool 20 is introduced into the pipe to expand it to the shape shown in Fig. 4, and to trim the expanded edge. A band or iron ferrule 31 is then placed on the tool 21 and introduced into the expanded end of the pipe 16. After the band 31 is in place in the lead pipe 16 and the tool 21 is withdrawn, the expanded edge of the pipe is then turned down or spun over the adjacent edge of the ferrule 31, to hold the ferrule 31 in place. This operation is performed by means of a wooden tool 34, which is suitably secured to a bracket 35, mounted on the body 11 of the machine illustrated in Fig. 1.

What I claim is:

1. A tool adapted to be rotated for expanding the end of a pipe consisting of a bar having longitudinal teeth, with enlargements at their bases, adapted to form a collar upon the end of a pipe.

2. A tool consisting of a bar having longitudinal teeth with rounded edges, adapted to be rotated to expand the end of a pipe and a knife located upon the bar and adapted to trim the end of the pipe.

ROBERT A. MERRILL.

Witnesses:
   E. W. McCallister,
   Walter F. Murray.